G. W. BULLEY.
RUBBER WORKING MACHINE.
APPLICATION FILED MAR. 10, 1917.

1,260,320.

Patented Mar. 26, 1918.

Inventor,
George W. Bulley,
by Brown Nissen & Sprinkle
Attys.

UNITED STATES PATENT OFFICE.

GEORGE W. BULLEY, OF CHICAGO, ILLINOIS.

RUBBER-WORKING MACHINE.

1,260,320.  Specification of Letters Patent.  Patented Mar. 26, 1918.

Application filed March 10, 1917. Serial No. 153,834.

*To all whom it may concern:*

Be it known that I, GEORGE W. BULLEY, a citizen of the United States, residing at Chicago, in the county of Cook and State of Illinois, have invented certain new and useful Improvements in Rubber-Working Machines, of which the following is a specification.

My invention relates to mixing machines, and particularly to machines which are adapted for mixing and compounding rubber, and the like.

One object of my invention is the provision of a mixing machine having means therein adapted to separate particles of material passing therethrough, and mix these divided particles with other particles of the material to facilitate thoroughly mixing such material.

A further object is the provision of simple means for dividing the material into small portions as it comes from the mixing machine, and then mix these small portions together again.

Other objects will appear hereinafter.

An embodiment of my invention is illustrated in the accompanying drawing, forming a part of this specification, and in which—

Figure 1:
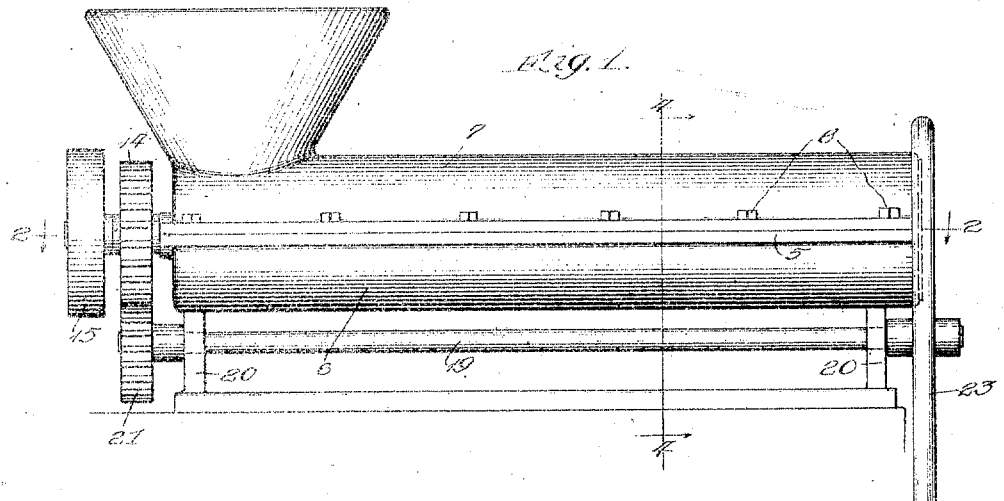
Figure 1 is a side elevation of a mixing machine embodying my invention.

I have shown a casing 5 formed of two parts 6 and 7, secured together by means of cap screws 8. It will, however, be apparent that a suitable casing to embody my invention may be formed in many other manners. In the form illustrated, I have shown two substantially tubular chambers 9 and 10 in the casing 5. In each of the chambers 9 and 10 I mount a suitable mixing and distributing member. In the form shown, I have illustrated a screw member 11 in chamber 9, and a screw member 12 in chamber 10. These screw members illustrate mixing and distributing means, and it will be apparent that other forms of such means may be used, when so desired. The stems 13 of the screw members 11 and 12 extend through the front or feeding end of the casing 5, and are provided with gears 14. The gears 14 are connected together by a gear 21 so that the members 11 and 12 rotate in the same direction. One of the stems 13 is provided with a pulley 15 which may be connected to any suitable source of power, not shown, by an endless belt, not shown. The casing 5 is provided with an opening 16 between the chambers 9 and 10 substantially throughout the length of their adjacent sides so that material will be free to pass from one of the chambers to the other in the operation of the machine.

It is desirable to form the screw members 11 and 12 in such a manner or to connect them in such a manner that one will be able to force material through the casing 5 at a greater speed than the other. This will cause one of the members to carry material away from the other member through opening 16, so that particles of the material will be separated from other particles, and mixed again with still other particles during their passage through the casing 5. One of the members 11 and 12 may have its pitch longer than the other in order to cause one to force the material along faster than the other, or one may revolve at a different rate of speed from the other.

The discharge end of the casing 5 is preferably closed by a die 17, having perforations 18 therein. The die 17 may extend across the discharge opening of both of the chambers 9 and 10 so that material from both of said chambers will be discharged through said die. It will be apparent that the die 17 may be made in more than one part, or of a different size or shape than shown.

Figure 2:
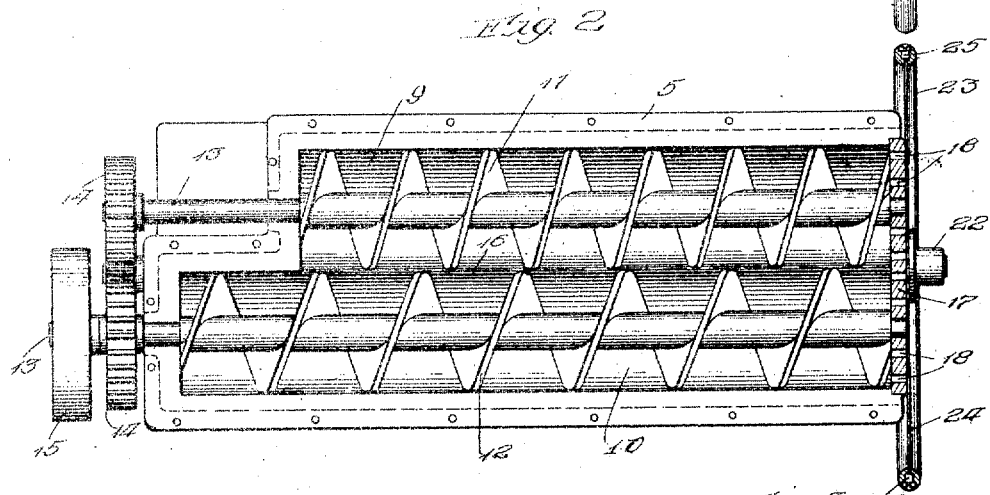
Fig. 2 is a section taken on a horizontal plane on line 2—2 of Fig. 1.
Figures 3, 4:
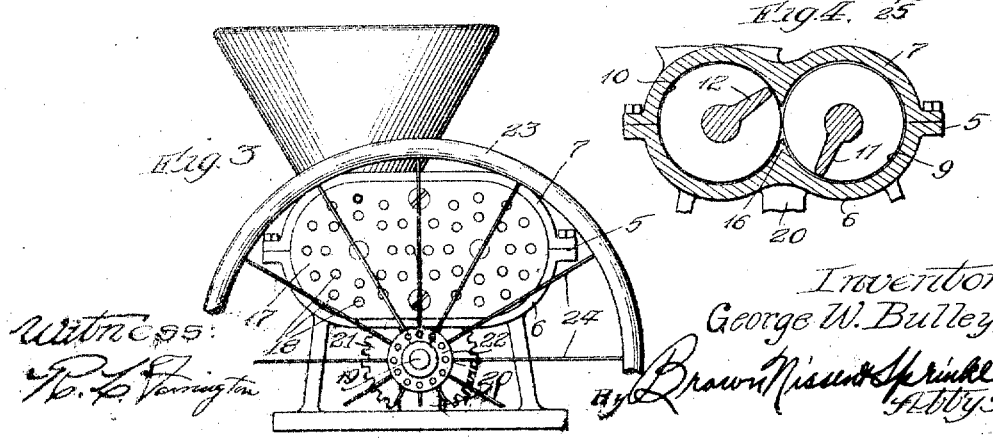
Fig. 3 is a broken rear end view of the device.
Fig. 4 is a section taken as on line 4—4 in Fig. 1.

The die 17 is preferably mounted so that its outer surface extends slightly beyond, or at least flush with the discharge end of the casing 5, in order to permit a mixing or severing means to travel over the outer surface of the die 17 in order to remix the particles of material as they are forced through the openings 18. As an example of such a remixing means, I have mounted a shaft 19 beneath the casing 5 in the base 20 and connected the shaft 19 with one of the gears 14 by fixing gear 21 to shaft 19. On the end of the shaft 19 at the discharge end of the casing 5, I provide a wheel made up of a hub 22 and rim 23. Wire spokes 24 connect the hub and rim of the wheel. The wire spokes 24 may be connected to the hub and rim in any desirable manner. The form I have shown comprises bending the inner ends of the spokes 24 and passing them through openings in the hub 22, as clearly indicated in Figs. 2 and 3. The outer ends of the spokes are secured to the rim 23 by nipples 25, similar to the nipples employed in the conventional bicycle wheel construction. This moving and severing device divides the smooth streams of materials coming from the openings 18 and moves these divided parts around to other of the divided parts coming from other of the openings 18, thereby mixing the material further as it is discharged from the machine.

In smaller sizes of mixing machines, as above indicated, no cooling means will be required. It will be found desirable, however, to use water-cooling jackets on larger devices. I have not shown any such cooling devices, but it is apparent that one skilled in the art of rubber mixing, and the like, will be familiar with providing suitable cooling means for the device.

While I have illustrated and described the preferred form of my invention, I do not desire to be limited to the precise details set forth, but desire to avail myself of such variations and changes as come within the scope of the appended claims.

The method disclosed herein constitutes the subject matter of my copending application Serial No. 154,968, filed Mar 15, 1917.

I claim:—

1. A mixing machine comprising a housing having a plurality of chambers therein in communication along their adjacent sides; and relatively differential mixing devices in said chambers adapted to progress the material at different speeds in said chambers.

2. A mixing machine comprising a plurality of differentially operable mixing members having their axes in substantial parallelism and acting to transfer material back and forth between the members and a casing inclosing the mixing members, and forming mixing chambers, and having an opening establishing communication for the passage of the material between the adjacent sides of said members.

3. A mixing machine comprising a casing having a plurality of chambers side by side and communicating with each other along their adjacent sides; a screw member in and substantially fitting each of the chambers, said screw members being adapted to move material at different speeds through said casing; and perforated means at the discharge ends of said chambers adapted to retard the movements of material by the screw members from the casing.

4. A mixing machine comprising a plurality of mixing members arranged to progress portions of the material in the same general direction at different speeds; a casing around the mixing members, there being an opening in the casing between the adjacent sides of said mixing members providing means whereby the mixing members force material laterally from one to another of said mixing members; and means for resisting the free passage of material from the casing.

5. A mixing machine comprising a casing having a plurality of discharge openings therein; conveying means in the casing; and means mounted to pass across the outer sides of said discharge openings adapted to move material from one of said openings to another thereof to facilitate mixing said material.

6. A mixing machine comprising a casing having a plurality of discharge openings; a plurality of independent means for forcing material from the casing through said discharge openings; and a rotating wheel having a plurality of wire spokes mounted adjacent said discharge openings adapted to move material from one of the discharge openings to another of said openings to facilitate mixing material.

7. A mixing machine comprising the combination of a housing having a plurality of intercommunicating mixing chambers and having an inlet opening and a discharge opening, and relatively differential screw mixing members in said chambers for manipulating the material and progressing it toward said discharge opening.

8. A mixing machine comprising the combination of a housing having a plurality of intercommunicating mixing chambers and having an inlet opening and a discharge opening, relatively differential screw mixing members in said chambers for manipulating material and progressing it toward said discharge opening, and means for retarding the discharge of the material from said opening.

9. In a mixing machine, the combination of a casing having a plurality of tubular communicating chambers, rotating screws substantially fitting said chambers and arranged to move the material relatively differentially and simultaneously manipulate said material.

10. In a mixing machine, the combination of a casing having a plurality of rotating screw members positioned in substantially parallelism and in close relation and each operating to manipulate a mass of material and progressing masses at different speeds longitudinally, and a housing forming individual chambers inclosing said screw members and arranged with intercommunicating passages for the transference of material from one screw member to another.

11. In a mixing machine, the combination of a casing having a plurality of rotating screw members each operating to manipulate a mass of material and progressing masses at different speeds longitudinally, a housing forming individual chambers inclosing said screw members and arranged with intercommunicating passages to permit the intermixing of portions of material being manipulated by said screw members.

12. In a mixing machine, the combination of a casing having a plurality of rotating screw members each operating to manipulate a mass of material and progressing masses at different speeds longitudinally, a housing forming individual chambers inclosing said screw members and arranged with intercommunicating passages to permit the intermixing of portions of material being manipulated by said screw members, and a hopper communicating with said chambers and into which the material is fed.

In testimony whereof I have signed my name to this specification on this 7th day of March, A. D. 1917.

GEORGE W. BULLEY.